(12) United States Patent
Tsirkin et al.

(10) Patent No.: US 9,697,029 B2
(45) Date of Patent: Jul. 4, 2017

(54) GUEST IDLE BASED VM REQUEST COMPLETION PROCESSING

(71) Applicant: Red Hat Israel, LTD, Raanana (IL)

(72) Inventors: Michael S. Tsirkin, Yokneam Illit (IL); Paolo Bonzini, Turate (IT)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/529,015

(22) Filed: Oct. 30, 2014

(65) Prior Publication Data

US 2016/0124762 A1    May 5, 2016

(51) Int. Cl.
*G06F 9/455* (2006.01)
*G06F 9/48* (2006.01)

(52) U.S. Cl.
CPC ...... *G06F 9/45545* (2013.01); *G06F 9/45558* (2013.01); *G06F 9/4825* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,684,281 B1* | 1/2004 | Sugahara | G06F 13/24 710/260 |
| 7,152,026 B1* | 12/2006 | Merritt | G06F 11/2028 703/13 |
| 7,533,207 B2 | 5/2009 | Traut et al. | |
| 8,635,615 B2 | 1/2014 | Chiang et al. | |
| 2004/0221285 A1* | 11/2004 | Donovan | G06F 9/485 718/1 |
| 2005/0076324 A1* | 4/2005 | Lowell | G06F 9/45558 717/100 |
| 2009/0183180 A1* | 7/2009 | Nelson | G06F 9/45533 719/319 |
| 2009/0241112 A1 | 9/2009 | Shimogawa | |
| 2011/0119422 A1 | 5/2011 | Grouzdev | |
| 2014/0082240 A1 | 3/2014 | Coleman et al. | |
| 2014/0082618 A1 | 3/2014 | Yoshida et al. | |

OTHER PUBLICATIONS

Irfan Ahmad et al., "Improving Performance with Interrupt Coalescing for Virtual Machine Disk IO in VMware ESX Server," Retrieved from the Internet on Oct. 30, 2014, 9 pages, World Wide Web, http://www.mashtizadeh.org/papers/vpact-vic-nop.pdf.
Irfan Ahmad et al., "vIC: Interrupt Coalescing for Virtual Machine Storage Device IO," USENIX Annual Technical Conference, 2011, 14 pages, World Wide Web, http://static.usenix.org/event/atc11/tech/final_files/atc11_proceedings.pdf#page=55.

* cited by examiner

*Primary Examiner* — Emerson Puente
*Assistant Examiner* — Jonathan R Labud
(74) *Attorney, Agent, or Firm* — Lowenstein Sandler LLP (57) ABSTRACT

A hypervisor identifies one or more interrupts of a networking device for a virtual machine. The hypervisor queues the interrupts and determines the execution state of at least one virtual processor of a virtual machine. Upon determining that the execution state of the virtual processor is active, the hypervisor continues queuing the interrupts of the networking device. Upon determining that the execution state of the virtual processor has changed to idle, the hypervisor provides the queued interrupts to the virtual machine.

17 Claims, 5 Drawing Sheets

GUEST IDLE BASED VM REQUEST COMPLETION PROCESSING

TECHNICAL FIELD

The present disclosure is generally related to computer systems, and more particularly, to interrupt processing in computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

One resource managed by the host machine is a networking device. In order to manage the host's network devices, the hypervisor may assign them to virtual machines for exclusive use. Alternatively, it can provide virtual hardware to the virtual machines and use host machine resources to provide connectivity to the virtual hardware. For example, the hypervisor could provide a virtual network device and attach it to a physical network interface. It would then forward any network packets destined to the virtual machine to a receive queue of the virtual network device, and forward any network packets transmitted by the virtual machine via the physical network interface. The networking device, which can be a physical device assigned to the virtual machine, or a virtual device, can have multiple queues for managing incoming packets to be received by a virtual machine and outgoing packets transmitted by a virtual machine. When the networking device has completed a unit of work, it can deliver a signal to the requesting virtual machine to indicate that packets are ready for delivery, typically known as an "interrupt." Interrupt coalescing is a technique in which the delivery of the interrupts is deferred until a predetermined number of interrupts are queued, or an interval timer has triggered.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for managing coalesced interrupts of a network device.

One resource managed by the host machine is a networking device that may be a physical networking device, assigned to the virtual machine for exclusive use, or a virtual networking device, exposed by the hypervisor to the virtual machine and connected to the network by means of a physical networking device. When the networking device has completed a unit of work, it can deliver a signal to the requesting virtual machine to indicate that packets are ready for delivery, typically known as an "interrupt." Interrupt coalescing is a technique in which the delivery of the interrupts is deferred until a predetermined number of interrupts are queued, or an interval timer has triggered. This technique can reduce interrupt load on a virtual machine and reduce the risk of "receive live lock," where interrupts can interfere with an application submitting new requests. However, it can increase latency to the point where the application may become blocked while waiting for the interrupt to arrive, preventing it from completing any additional work. This can result in an increase in idle time, wasting CPU resources, as well as a significant decrease in operational throughput.

Aspects of the present disclosure address the above noted deficiency by decreasing the latency inherent with coalescing without requiring changes to an application or virtual machine. In an illustrative example, a hypervisor identifies one or more interrupts of a networking device for a virtual machine. The hypervisor can queue the one or more interrupts of the networking device. Interrupts may be queued by the networking device, by the hypervisor in a data store such as random access memory, or in any other manner. In one illustrative example, the hypervisor may queue the one or more interrupts in a data structure accessible to the hypervisor, such as a bitmap, a linked list, or any similar method for storing data. The hypervisor may then determine an execution state of at least one virtual processor of the virtual machine (e.g., running, idle, pre-empted, etc.).

Upon determining that the execution state of the virtual processor is active (e.g., not idle), the hypervisor may continue queuing interrupts for the networking device. Upon determining that the execution state of the virtual processor has changed to idle, the hypervisor may provide the one or more queued interrupts to the virtual machine. A virtual processor can become idle by entering a state in which the virtual processor may be waiting for the receipt of an interrupt from a networking device, the completion of an input/output (I/O) operation, or the like. In certain implementations, the hypervisor may provide the interrupts to the virtual machine by first retrieving the one or more queued interrupts from the networking device. Alternatively, if the hypervisor had previously stored the interrupts in in a data store, the hypervisor may instead retrieve the interrupts from the data store. The hypervisor may then send the one or more queued interrupts to the virtual processor of the virtual machine.

In some implementations, to further reduce latency, the hypervisor may place timeouts on the interrupts that will permit the hypervisor to provide the interrupts to the virtual machine if the execution state of virtual processor does not change to idle within a predefined period. In one illustrative example, the hypervisor can first determine the period of time that the interrupt has been waiting in the queue. The hypervisor can then determine whether the period of time meets a first threshold condition. The threshold value may represent a total amount of time elapsed since the interrupt was placed on the queue (e.g., in microseconds, etc.). Alternatively, the threshold value may be a total amount of CPU clock cycles executed since the interrupt was placed on the queue. The threshold may be defined by an administrator (e.g., via a configuration file, via a graphical user interface, etc.), hard-coded in the hypervisor, or set in any other manner.

Upon determining that the first threshold condition is met, the hypervisor can provide the interrupts to the virtual machine if the virtual processor initiates an exit that transfers control of the physical processor to the hypervisor, such as executing a privileged instruction, an I/O instruction, or a scheduling decision. If the virtual processor does not initiate an exit, the hypervisor can continue monitoring the period of time that the interrupt has been in queue. If the period of time meets a second threshold condition, the hypervisor can provide the queued interrupts to the virtual machine immediately.

In some implementations, the first threshold condition can be set so that it is lower than the second threshold condition. For example the first threshold condition may be set at 10 microseconds and the second threshold condition may be set at 20 microseconds. Thus, if the hypervisor determines that the interrupts have waited in queue for 10 microseconds, it can provide them to the virtual machine the next time a virtual processor of the virtual machine has transferred control of the physical processor to the hypervisor by issuing an exit (such as a privileged instruction). If no exit is detected, and the interrupts remain in queue for 20 microseconds, the hypervisor can provide them to the virtual machine immediately without waiting any longer.

A single virtual processor may be associated with the networking device. In other implementations, a group of virtual processors may be associated with the networking device. To provide the interrupts, the hypervisor may need to determine which of the group of virtual processors should receive the queued interrupts. In some implementations, the hypervisor may receive information from the virtual machine that maps at least one of the virtual processors from the group of virtual processors to the networking device. The hypervisor can then store the mapping information in a data store such as random access memory, or in any other manner. In one illustrative example, the hypervisor may store the mapping in a data structure accessible to the hypervisor such as an array, a hash table, or any similar method for storing data. The hypervisor may then pair the one or more queued interrupts with at least one of the plurality of processors using the mapping information. The hypervisor may also use the mapping information to poll the networking device for other work that needs to be completed for the virtual machine. For example, if the hypervisor detects that the execution state of a particular virtual processor has changed to idle, it can use the mapping information to determine if there are any networking devices that have queued interrupts or data packets that need to be delivered to that virtual processor.

In another illustrative example, aspects of the present disclosure described above may be applied to a non-virtualized environment, where an OS may perform the above noted functionality attributed to a hypervisor and an application may perform the above noted functionality attributed to a VM. In this example, the OS may provide interrupts to the application when the application transfers control to the OS (such as issuing a system call, or a scheduler interaction).

Aspects of the present disclosure are thus capable of reducing latency for applications running within a guest OS of a VM. More particularly, aspects of the present disclosure allow a hypervisor to provide coalesced interrupts to a virtual processor without significantly interfering with VM execution.

Figure 1:
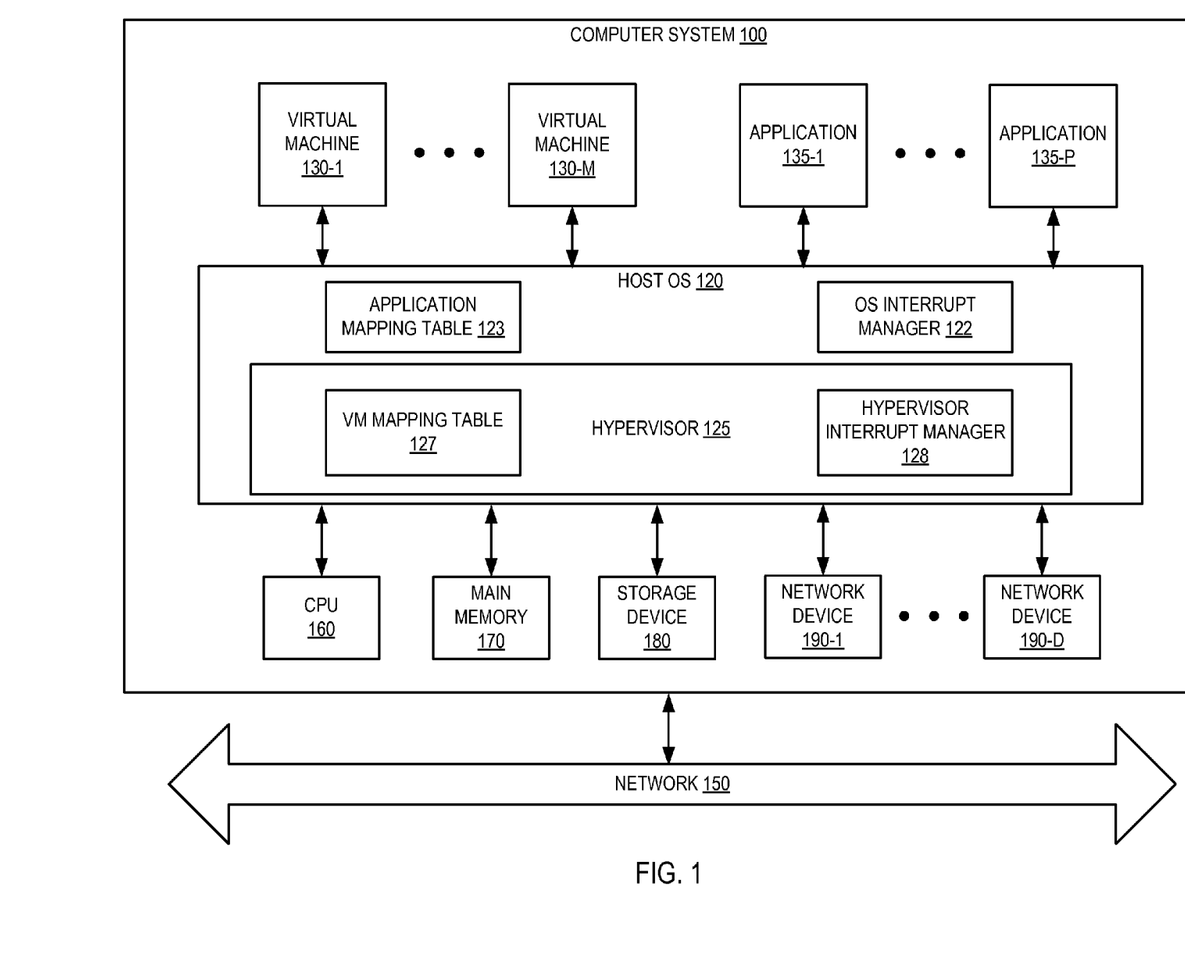
FIG. 1 depicts a high-level component diagram of an example computer system architecture, in accordance with one or more aspects of the present disclosure.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more network devices 190-1 through 190-D, where D is a positive integer (e.g., a network interface controller (NIC), an I/O device, a CD/DVD-ROM drive, etc.). In certain implementations, main memory 170 may be non-uniform access (NUMA), such that memory access time depends on the memory location relative to CPU 160.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 may additionally comprise one or more virtual machines (VMs) 130-1 through 130-M, where M is a positive integer, one or more applications 135-1 through 135-P, where P is a positive integer, and host operating system (OS) 120. VMs 130 are a software implementation of a machine that executes programs as though it were an actual physical machine. Host OS 120 manages the hardware resources of the computer system and provides functions such as inter-process communication, scheduling, memory management, and so forth. Applications 135-1 through 135-P are software applications running on the same CPU.

Host OS 120 may comprise a hypervisor 125, which provides a virtual operating platform for VMs 130 and manages their execution, an OS interrupt manager 122, and an application mapping table 123. Hypervisor 125 may comprise vm mapping table 127, as well as hypervisor interrupt manager 128. It should be noted that in some alternative implementations, hypervisor 125 may be external to host OS 120, rather than embedded within host OS 120, or may replace host OS 120.

Hypervisor interrupt manager 128 can manage coalesced interrupt processing associated with one or more VMs 130-1 through 130-M, as described in detail below with respect to FIGS. 2 and 4. OS interrupt manager 122 that can manage coalesced interrupt processing associated with one or more applications 135-1 through 135-P, as described in detail below with respect to FIGS. 3 and 4.

Hypervisor 125 can use VM mapping table 127 to store cross reference information regarding which virtual processors VMs 130-1 through 130-M are associated with a particular networking device 190. Hypervisor 125 may also use the mapping information to poll the networking device 190 for other work that needs to be completed for VMs 130-1 through 130-M. Hypervisor 125 may store a unique identifier that is associated with each of the virtual processors, along with an identifier for the associated networking device 190 for use by hypervisor interrupt manager 128. VM mapping table 127 may be a memory location within hypervisor 125. Alternatively, VM mapping table 127 may be written to a location in storage device 180.

Host OS 120 can use application mapping table 123 to store cross reference information regarding which applications 135-1 through 135-P are associated with a particular networking device 190. In some implementations, host OS 120 may receive information from the application that maps the application to the networking device. Host OS 120 can then store the mapping information in a data store accessible to host OS 120 such as random access memory, using a data structure such as an array, a hash table, or any similar method for storing data. Host OS 120 may then pair the one or more queued interrupts with the application using the mapping information. Host OS 125 may store a unique identifier that is associated with each of the applications, along with an identifier for the associated networking device 190 for use by OS interrupt manager 122. Application mapping table 123 may be a memory location within host OS 120. Host OS 120 may use application mapping table 123 to poll the networking device for other work that needs to be completed for applications 135-1 through 135-P. For example, if the operating system detects that the execution state of a particular application 135 has changed to idle, it can use the mapping information to determine if there are any networking devices that have queued interrupts or data packets that need to be delivered to that virtual processor.

Figure 2:
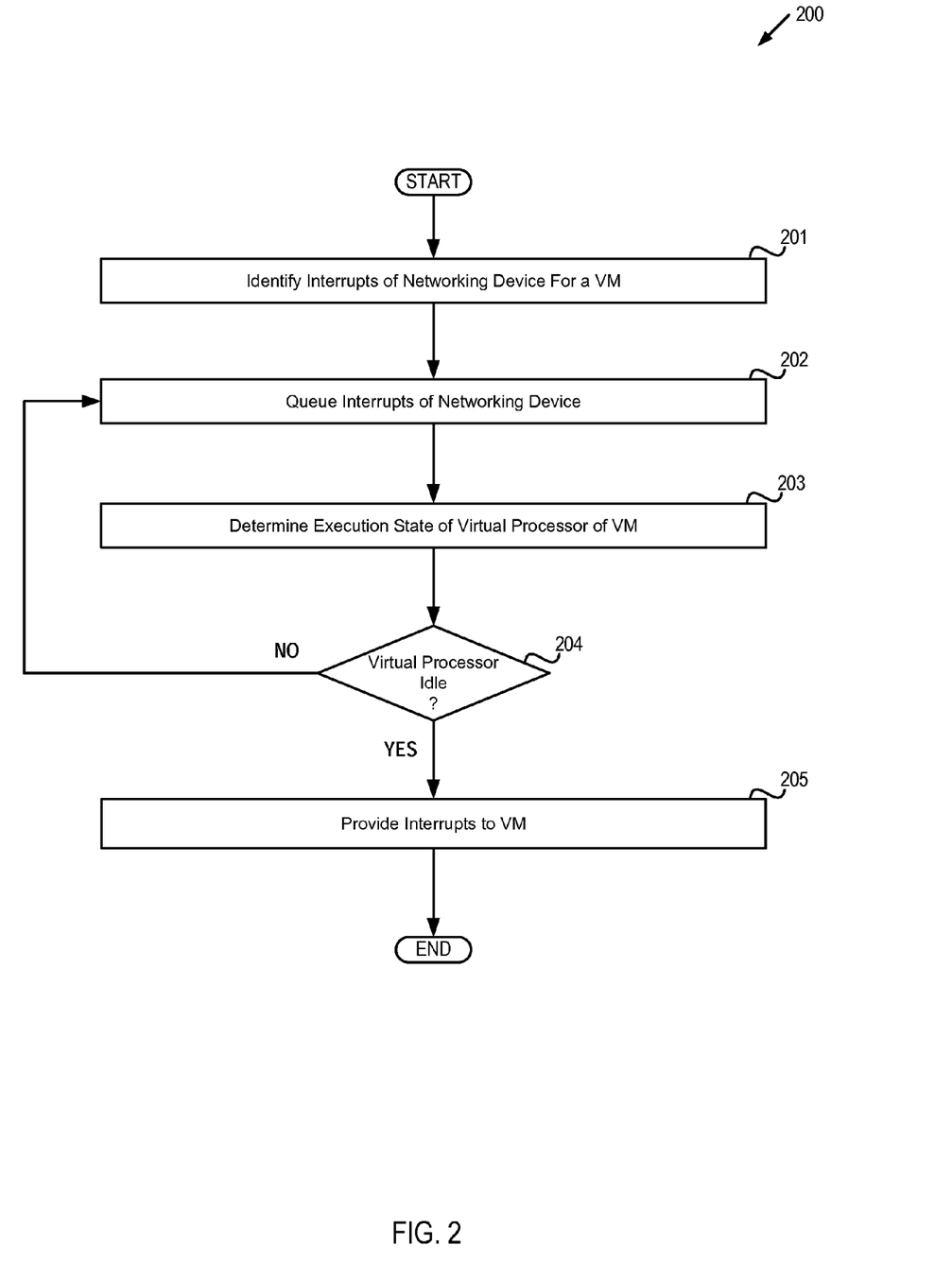
FIG. 2 depicts a flow diagram of a method for managing coalesced interrupt processing associated with a virtual machine by a hypervisor, in accordance with one or more aspects of the present disclosure.

FIG. 2 depicts a flow diagram of an example method 200 for managing coalesced interrupt processing associated with a virtual machine. The method may be performed by processing logic that may comprise hardware (circuitry, dedicated logic, etc.), software (such as is run on a general purpose computer system or a dedicated machine), or a combination of both. In one illustrative example, method 200 may be performed by hypervisor interrupt manager 128 of hypervisor 125 in FIG. 1. Alternatively, some or all of method 200 might be performed by another component or machine. It should be noted that blocks depicted in FIG. 2 could be performed simultaneously or in a different order than that depicted.

At block 201, processing logic identifies one or more interrupts of a networking device for a virtual machine. At block 202, processing logic can queue the one or more interrupts of the networking device. Interrupts may be queued by the networking device, by a hypervisor in a shared memory space, or in any other manner. In one illustrative example, processing logic may queue the one or more interrupts in a data store accessible to a hypervisor, such as random access memory, using a data structure such as a bitmap, a linked list, or any similar method for storing data.

At block 203, processing logic may then determine an execution state of at least one virtual processor of the virtual machine (e.g., running, idle, pre-empted, etc.). In certain implementations, processing logic may access a mapping table such as VM mapping table 127 of FIG. 1 to identify the at least one virtual processor. For example, processing logic may use the unique identifier of the shared device to look up the associated virtual processor in the VM mapping table to identify the at least one virtual processor.

At block 204, processing logic branches depending on the execution state of the virtual processor determined at block 203. If the execution state indicates that the virtual processor is executing (e.g., not idle), execution returns to block 202 to continue queuing additional interrupts for the networking device. If the execution state indicates that the virtual processor is idle, execution proceeds to block 205. A virtual processor can become idle by entering a state in which the virtual processor may be waiting for the receipt of an interrupt from a networking device, the completion of an input/output (I/O) operation, or the like.

At block 205, processing logic can provide the one or more queued interrupts to the virtual machine. In certain implementations, processing logic may provide the interrupts to the virtual machine by first retrieving the one or more queued interrupts from the networking device. Alternatively, if the interrupts had been previously stored in in a data store, processing logic may instead retrieve the interrupts from the data store. Processing logic may then send the one or more queued interrupts to the virtual processor of the virtual machine. After block 205, the method of FIG. 2 terminates.

Figure 3:
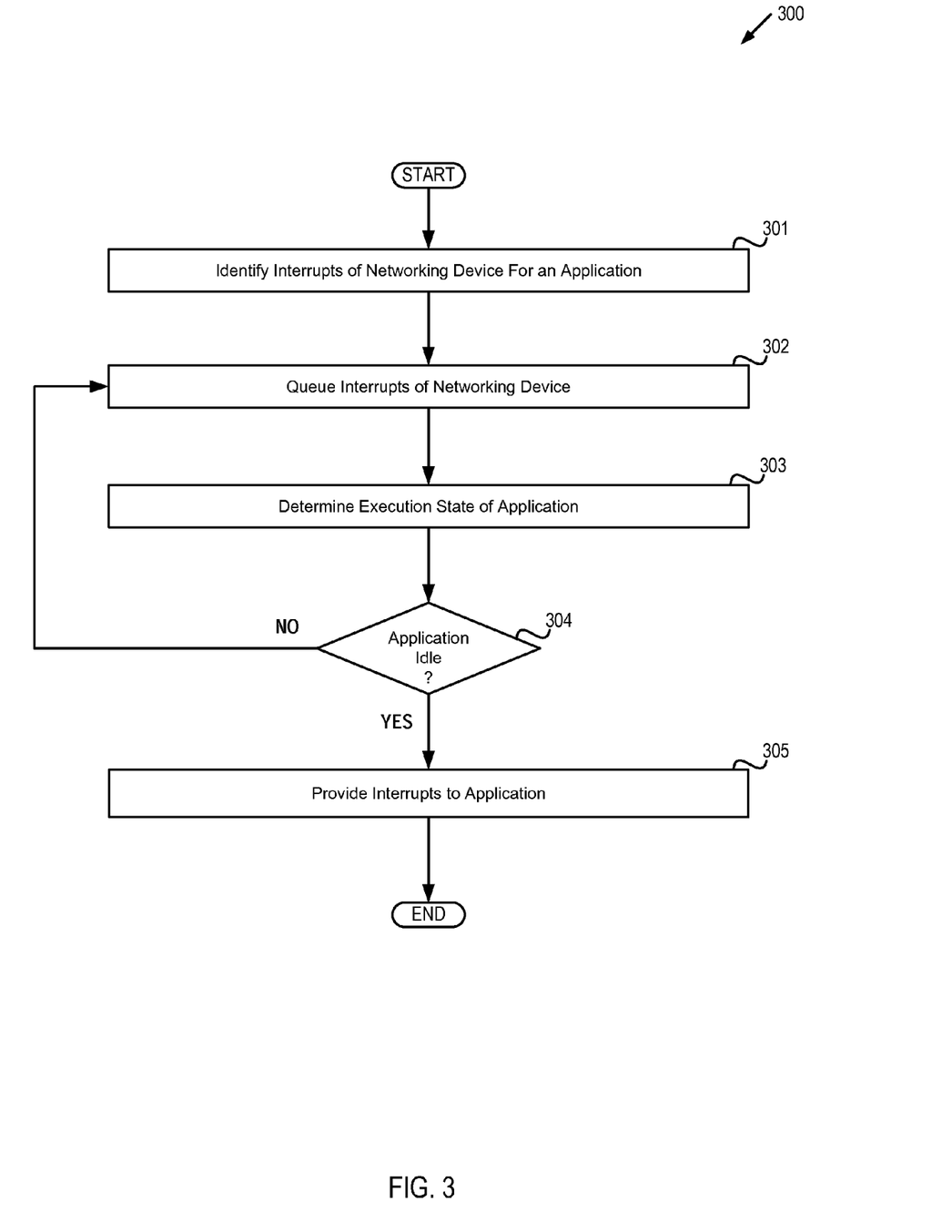
FIG. 3 depicts a flow diagram of a method for managing coalesced interrupt processing associated with an application by an operating system, in accordance with one or more aspects of the present disclosure.

FIG. 3 depicts a flow diagram of an example method 300 for managing coalesced interrupt processing associated with an application. The method may be performed by processing logic that may comprise hardware (circuitry, dedicated logic, etc.), software (such as is run on a general purpose computer system or a dedicated machine), or a combination of both. In one illustrative example, method 300 may be performed by OS interrupt manager 122 of host OS 120 in FIG. 1. Alternatively, some or all of method 300 might be performed by another component or machine. It should be noted that blocks depicted in FIG. 3 could be performed simultaneously or in a different order than that depicted.

At block 301, processing logic identifies one or more interrupts of a networking device for an application. At block 302, processing logic can queue the one or more interrupts of the networking device. Interrupts may be queued by the networking device, by an OS in a shared memory space, or in any other manner. In one illustrative example, processing logic may queue the one or more interrupts in a data store accessible to the OS, such as random access memory, using a data structure such as a bitmap, a linked list, or any similar method for storing data.

At block 303, processing logic may then determine an execution state of at least one application (e.g., running, idle, pre-empted, etc.). In certain implementations, processing logic may access a mapping table such as application mapping table 123 of FIG. 1 to identify the at least one application. For example, processing logic may use the unique identifier of the shared device to look up the associated application in the application mapping table to identify the at least one application.

At block 304, processing logic branches depending on the execution state of the application determined at block 303. If the execution state indicates that the application is executing (e.g., not idle), execution returns to block 302 to continue queuing additional interrupts for the networking device. If the execution state indicates that the application is idle, execution proceeds to block 305.

At block 305, processing logic can provide the one or more queued interrupts to the application. In certain implementations, processing logic may provide the interrupts to the application by first retrieving the one or more queued interrupts from the networking device. Alternatively, if the interrupts had been previously stored in in a data store, processing logic may instead retrieve the interrupts from the data store. Processing logic may then send the one or more queued interrupts to the application. After block 205, the method of FIG. 2 terminates.

Figure 4:
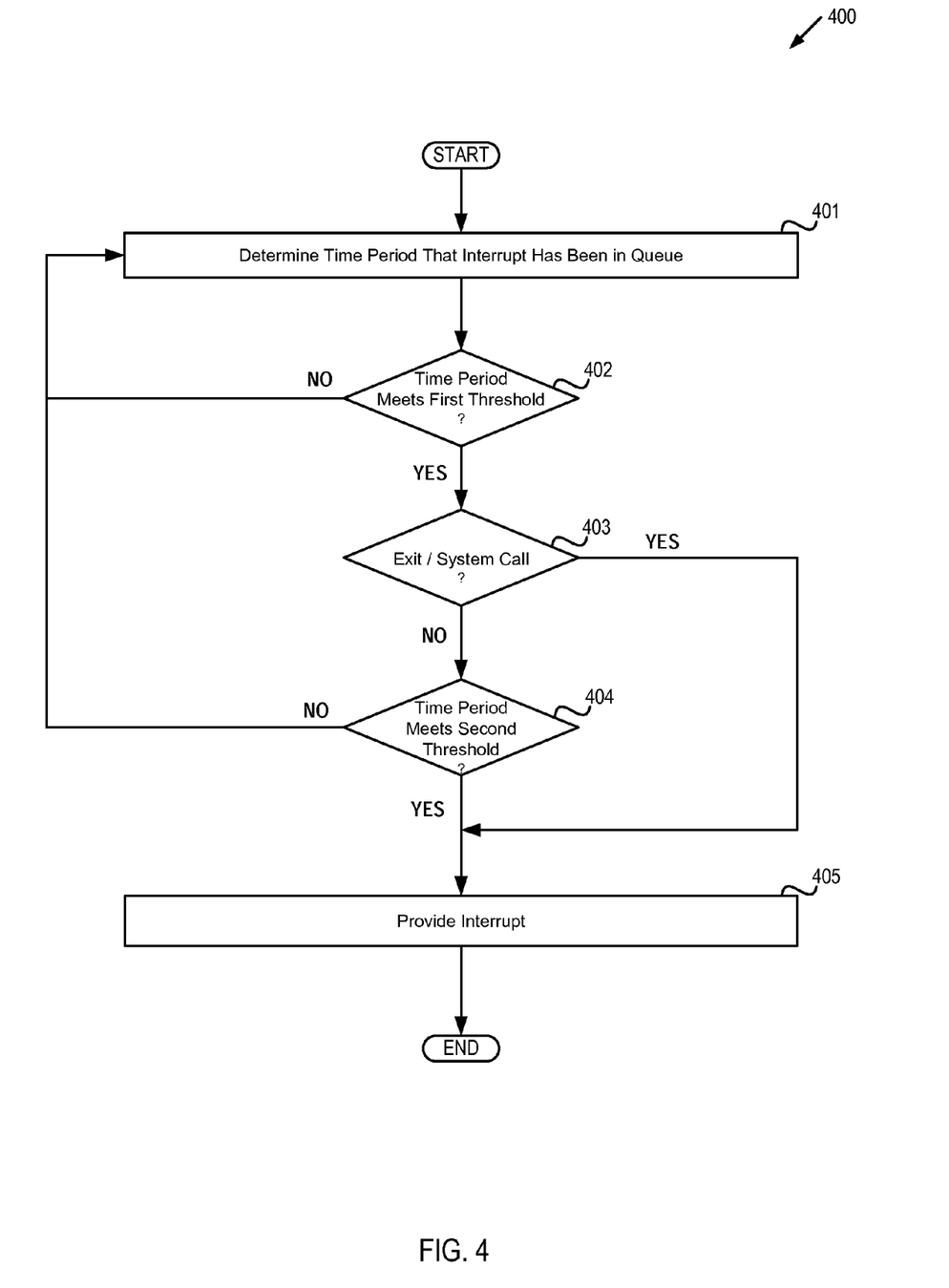
FIG. 4 depicts a flow diagram of a method for managing coalesced interrupt processing based on time thresholds, in accordance with one or more aspects of the present disclosure.

FIG. 4 depicts a flow diagram of an example method 400 for managing coalesced interrupt processing based on time thresholds. The method may be performed by processing logic that may comprise hardware (circuitry, dedicated logic, etc.), software (such as is run on a general purpose computer system or a dedicated machine), or a combination of both. In one illustrative example, method 200 may be performed by hypervisor interrupt manager 128 of hypervisor 125 in FIG. 1. Alternatively, in a non-virtualized environment, method 400 may be performed by OS interrupt manager 122 of host OS 120 of FIG. 1. Some or all of method 400 might be performed by another machine. It should be noted that blocks depicted in FIG. 4 could be performed simultaneously or in a different order than that depicted.

At block 401, processing logic may determine the period of time that one or more interrupts have been waiting in the queue.

At block 402, processing logic may determine whether the period of time meets a first threshold condition. If so, execution proceeds to block 403, otherwise execution returns to block 401 to continue monitoring the period of time the interrupts remain in queue. The threshold value may represent a total amount of time elapsed since the interrupt was placed on the queue (e.g., in microseconds, etc.). Alternatively, the threshold value may be a total amount of CPU clock cycles executed since the interrupt was placed on the queue. The threshold may be defined by an administrator (e.g., via a configuration file, via a graphical user interface, etc.), hard-coded in the hypervisor, or set in any other manner.

At block 403, processing logic determines if an exit or system call has been executed. If so, execution proceeds to block 405, otherwise, execution continues to block 404. In a virtualized environment, processing logic determines whether an exit has been executed by a virtual processor of a VM (such as a privileged instruction). In certain implementations, processing logic may access a mapping table such as VM mapping table 127 of FIG. 1 to identify the at least one virtual processor. In a non-virtualized environment, processing logic determines whether a system call has been executed by an application. In certain implementations, processing logic may access a mapping table such as application mapping table 123 of FIG. 1 to identify the at least one application.

At block 404, processing logic may determine whether the period of time meets a second threshold condition. If so, execution proceeds to block 405, otherwise execution returns to block 401 to continue monitoring the period of time the interrupts remain in queue. In some implementations, the first threshold condition can be set so that it is lower than the second threshold condition. For example the first threshold condition may be set at 10 microseconds and the second threshold condition may be set at 20 microseconds. Thus, if the hypervisor determines that the interrupts have waited in queue for 10 microseconds, it can provide them to the virtual machine the next time a virtual processor of the virtual machine issues a privileged instruction. If no privileged instruction is detected, and the interrupts remain in queue for 20 microseconds, the hypervisor can provide them to the virtual machine immediately without waiting any longer.

At block 405, processing logic provides the one or more interrupts. In a virtualized environment, processing logic can provide the interrupts to a virtual processor of a virtual machine. In a non-virtualized environment, processing logic can provide the interrupts to an application. After block 405, the method of FIG. 4 terminates.

Figure 5:
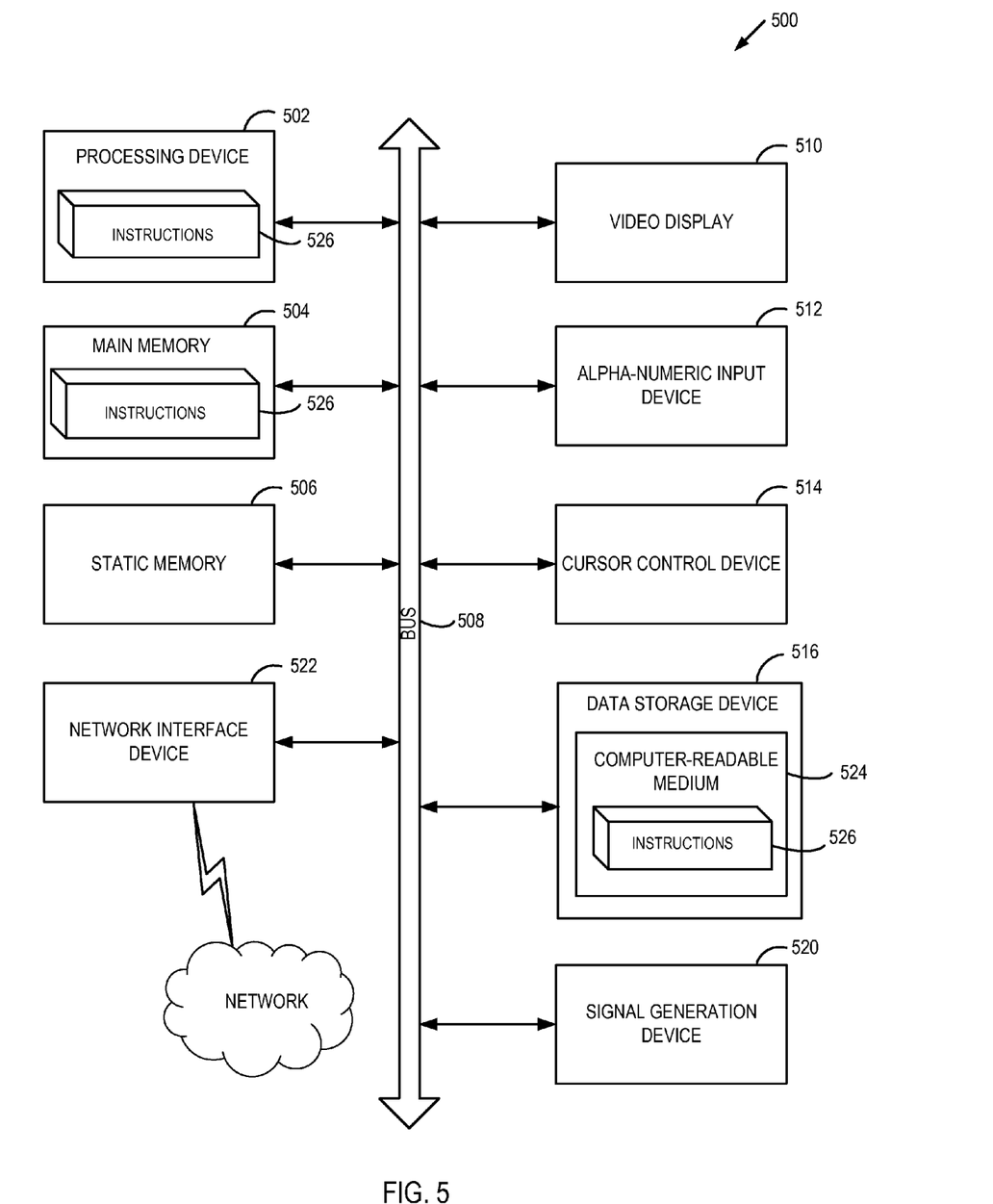
FIG. 5 depicts a block diagram of an illustrative computer system operating in accordance with examples of the invention.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions corresponding to the method of FIGS. 2-4, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "determining", "queuing", "retrieving," "storing," "pairing," "querying," "processing," "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

What is claimed is:
1. A method comprising:
   identifying, by a processing device executing a hypervisor, one or more interrupts of a networking device for a virtual machine;
   queuing the one or more interrupts of the networking device;
   determining, by the processing device executing the hypervisor, an execution state of at least one virtual processor of the virtual machine;
   responsive to determining that the execution state is idle, providing, by the processing device executing the hypervisor, the one or more queued interrupts to the virtual machine; and responsive to determining that the one or more queued interrupts have been queued for a period of time that meets a first threshold condition:
  determining that the at least one virtual processor has transferred control of a physical processor to the hypervisor; and
  providing, by the processing device executing the hypervisor, the one or more queued interrupts to the virtual machine.

2. The method of claim 1 wherein providing the queued interrupts comprises:
  retrieving, by the hypervisor, the one or more queued interrupts from the networking device; and
  sending, by the hypervisor, the one or more queued interrupts to the at least one virtual processor of the virtual machine.

3. The method of claim 1 further comprising providing, by the hypervisor, the one or more queued interrupts to the virtual machine upon determining that the one or more queued interrupts have been queued for a period of time that meets a second threshold condition.

4. The method of claim 1, wherein the at least one virtual processor represents a plurality of virtual processors.

5. The method of claim 4, further comprising:
  receiving, by the hypervisor, information from the virtual machine that maps at least one of the plurality of virtual processors to the networking device;
  storing, by the hypervisor, the mapping information in a data store accessible to the hypervisor; and
  pairing, by the hypervisor, the one or more queued interrupts with the at least one of the plurality of virtual processors using the mapping information.

6. The method of claim 5, further comprising:
  upon determining that the execution state of at least one of the plurality of virtual processors is idle, identifying the networking device associated with the at least one virtual processor in view of the mapping information;
  querying the networking device for one or more requests to be completed; and
  processing, by the hypervisor, the one or more requests.

7. A computing apparatus comprising:
  a memory; and
  a processing device, operatively coupled to the memory, to execute a hypervisor to:
    identify one or more interrupts of a networking device for a virtual machine;
    queue the one or more interrupts of the networking device;
    determine an execution state of at least one virtual processor of the virtual machine;
    responsive to determining that the execution state is idle, provide the one or more queued interrupts to the virtual machine; and
    responsive to determining that the one or more queued interrupts have been queued for a period of time that meets a first threshold condition:
      determine that the at least one virtual processor has transferred control of a physical processor to the hypervisor; and
      provide the one or more queued interrupts to the virtual machine.

8. The apparatus of claim 7 wherein to provide the queued interrupts, the processing device is to:
  retrieve, by the hypervisor, the one or more queued interrupts from the networking device; and
  send, by the hypervisor, the one or more queued interrupts to the at least one virtual processor of the virtual machine.

9. The apparatus of claim 7, wherein the processing device is further to provide, by the hypervisor, the one or more queued interrupts to the virtual machine upon determining that the one or more queued interrupts have been queued for a period of time that meets a second threshold condition.

10. The apparatus of claim 7, wherein the at least one virtual processor represents a plurality of virtual processors.

11. The apparatus of claim 10, wherein the processing device is further to:
  receive, by the hypervisor, information from the virtual machine that maps at least one of the plurality of virtual processors to the networking device;
  store, by the hypervisor, the mapping information in a data store accessible to the hypervisor; and
  pair, by the hypervisor, the one or more queued interrupts with the at least one of the plurality of virtual processors using the mapping information.

12. The apparatus of claim 11, wherein the processing device is further to:
  upon determining that the execution state of at least one of the plurality of virtual processors is idle, identify the networking device associated with the at least one virtual processor in view of the mapping information;
  query the networking device for one or more requests to be completed; and
  process, by the hypervisor, the one or more requests.

13. A non-transitory computer readable storage medium, having instructions stored therein, which when executed by a processing device of a computer system, cause the processing device to:
  identify, by the processing device executing an operating system, one or more interrupts of a networking device for an application;
  queue the one or more interrupts of the networking device;
  determine, by the processing device executing the operating system, an execution state of at least one application;
  responsive to determining that the execution state is idle, provide, by the processing device executing the operating system, the one or more queued interrupts to the application; and
  responsive to determining that the one or more queued interrupts have been queued for a period of time that meets a first threshold condition:
    determine that the at least one application has transferred control of a physical processor to the operating system; and
    provide, by the processing device executing the operating system, the one or more queued interrupts to the application.

14. The non-transitory computer readable storage medium of claim 13, wherein to provide the queued interrupts, the processing device is to:
  retrieve, by the operating system, the one or more queued interrupts from the networking device; and
  send, by the operating system, the one or more queued interrupts to the at least one application.

15. The non-transitory computer readable storage medium of claim 13, wherein the processing device is further to provide, by the operating system, the one or more queued interrupts to the application upon determining that the one or more queued interrupts have been queued for a period of time that meets a second threshold condition.

16. The non-transitory computer readable storage medium of claim 13, wherein the processing device is further to:
receive, by the operating system, information from the application that maps the application to the networking device;
store, by the operating system, the mapping information in a data store accessible to the operating system; and
pair, by the operating system, the one or more queued interrupts with the application using the mapping information.

17. The non-transitory computer readable storage medium of claim 16, wherein the processing device is further to:
upon determining that the execution state of the application is idle, identify the networking device associated with the application in view of the mapping information;
query the networking device for one or more requests to be completed; and
process, by the operating system, the one or more requests.

* * * * *